United States Patent [19]

Carlson

[11] 4,098,681

[45] Jul. 4, 1978

[54] OXIDATION OF MERCAPTANS IN A PETROLEUM DISTILLATE WITH A SUPPORTED METAL PHTHALOCYANINE CATALYST

[75] Inventor: David H. J. Carlson, Park Ridge, Ill.

[73] Assignee: UOP Inc., Des Plaines, Ill.

[21] Appl. No.: 789,757

[22] Filed: Apr. 21, 1977

Related U.S. Application Data

[63] Continuation-in-part of Ser. No. 714,073, Aug. 12, 1976.

[51] Int. Cl.$^2$ ............................................. C10G 27/06
[52] U.S. Cl. ................................................... 208/206
[58] Field of Search ...................... 208/206, 207, 189; 252/431 N, 428

[56] References Cited

U.S. PATENT DOCUMENTS

| 3,230,180 | 1/1966 | Larson | 252/431 N |
| 3,303,142 | 2/1967 | Maze et al. | 252/431 N |
| 3,408,287 | 10/1968 | Urban et al. | 208/206 |

*Primary Examiner*—George Crasanakis
*Attorney, Agent, or Firm*—James R. Hoatson, Jr.; Robert W. Welch; William H. Page, II

[57] ABSTRACT

A method for treating a sour petroleum distillate is disclosed. The distillate is treated in contact with a catalyst in the presence of an alkaline reagent at oxidation conditions, said catalyst having been prepared by forming an aqueous dispersion of a metal phthalocyanine comprising a soluble acid amide, contacting a solid adsorptive support with said dispersion at conditions to adsorb at least a catalytic amount of said metal phthalocyanine thereon. The resulting composite is subsequently dried.

10 Claims, No Drawings

OXIDATION OF MERCAPTANS IN A PETROLEUM DISTILLATE WITH A SUPPORTED METAL PHTHALOCYANINE CATALYST

CROSS-REFERENCE TO RELATED APPLICATIONS

This application is a continuation-in-part of a copending application Ser. No. 714,073 filed Aug. 12, 1976.

Processes for the treatment of a sour petroleum distillate wherein said distillate is passed in contact with a supported metal phthalocyanine catalyst disposed as a fixed bed in a treating or reaction zone, have become well known and widely accepted in the industry. The treating process is typically designed to effect the catalytic oxidation of offensive mercaptans contained in the sour petroleum distillate with the formation of innocuous disulfides. The oxidizing agent is most often air admixed with the sour petroleum distillate to be treated. Gasoline, including natural, straight run and cracked gasolines, is the most frequently treated sour petroleum distillate. Other sour petroleum distillates include the normally gaseous petroleum fractions as well as naphtha, kerosine, jet fuel, fuel oil, lube oil, and the like.

In the manufacture of a supported phthalocyanine catalyst, it is the practice to adsorb the phthalocyanine on an adsorptive support from a solution and/or dispersion thereof. Methanolic solutions or dispersions have heretofore provided a most active catalytic composite. However, methanol has become increasingly objectionable in that it is relatively expensive, toxic, and difficult to dispose of. Aqueous solutions by themselves afford a relatively poor distribution of the phthalocyanine on the adsorptive support and quality control is difficult to achieve. While the prior art, notably U.S. Pat. No. 3,108,081, suggests that improved solubility in aqueous solution is accomplished by the inclusion of a strong base, for example, annomia, ammonium hydroxide, and the like, it has now been found that a catalytic composite of substantially greater activity results when the additive is instead substantially neutral or a weak base as herein defined.

In one of its broad aspects, the present invention embodies a method for treating a sour petroleum distillate which comprises contacting said distillate with a supported metal phthalocyanine catalyst in the presence of an alkaline reagent at oxidation conditions, said catalyst having been prepared by forming an aqueous dispersion of a metal phthalocyanine comprising a soluble acid amide, contacting a solid adsorptive support with said dispersion at conditions to adsorb at least a catalytic amount of said metal phthalocyanine thereon; and drying the resulting composite.

A further embodiment is in a method for treating a sour petroleum distillate which comprises contacting said distillate with a supported cobalt phthalocyanine catalyst in the presence of an alkaline reagent at oxidation conditions, said catalyst having been prepared by forming an aqueous dispersion of cobalt phthalocyanine monosulfonate comprising a soluble diamide, contacting a solid adsorptive support with said dispersion at conditions to adsorb at least a catalytic amount of said phthalocyanine thereon, and drying the resulting composite.

One of the more specific embodiments is in a method for treating a sour petroleum distillate which comprises contacting said distillate with a supported cobalt phthalocyanine catalyst in the presence of an alkaline reagent at oxidation conditions, said catalyst having been prepared by forming an aqueous dispersion of cobalt phthalocyanine monosulfonate comprising urea, contacting an activated carbon support with said dispersion at conditions to adsorb from about 0.1 to about 10 wt. % cobalt phthalocyanine thereon, and drying the resulting composite.

In addition to the relatively inexpensive, non-toxic attributes of the acid amides employed herein, a further significant advantage resulting from the practice of this invention is in the biodegradable nature of, for example, urea, to substantially obviate the disposal problem encountered in the use of methanol.

Other objects and embodiments of this invention will become apparent in the following detailed specification.

Pursuant to the method of this invention, a metal phthalocyanine is adsorbed on a solid adsorbent support from an aqueous dispersion of said phthalocyanine, said dispersion further containing a soluble acid amide. The method of the present invention is applicable to the manufacture of a catalytic composite comprising any of the various metal phthalocyanines, for example, magnesium, titanium, hafnium, vanadium, tantalum, molybdenum, manganese, iron, cobalt, nickel, platinum, palladium, copper, silver, zinc and tin phthalocyanine, and the like. Cobalt phthalocyanine and vanadium phthalocyanine are particularly preferred metal phthalocyanines. The metal phthalocyanine is preferably employed herein as a derivative thereof, the commercially available sulfonated derivatives, for example, cobalt phthalocyanine monosulfonate, cobalt phthalocyanine disulfonate, or mixtures thereof, being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The acid amides of this invention are intended to include the water soluble, essentially neutral, aliphatic primary amides, for example, formamide, acetamide, propionamide, n-butyramide, isobutyramide, valeramide, and the like, and also the corresponding water soluble diamides, particularly malonamide and carbamide (urea). The selected acid amide, preferably urea, is advantageously first prepared in aqueous solution in sufficient amount to provide from about 0.2 to about 10 wt. % acid amide therein. From about a 4 to about a 6 wt. % concentration is particularly useful. In any case, the selected metal phthalocyanine is subsequently dispersed in the acid amide solution, preferably in an amount to provide a metal phthalocyanine/acid amide weight ratio of from about 1:1 to about 2:1. The resulting dispersion may be subsequently diluted to a larger volume more commensurate with the volume of solid adsorbent on which the metal phthalocyanine is to be adsorbed.

The solid adsorbent supports herein contemplated include any of the various and well-known adsorbent solid materials generally utilized as a catalyst support. Preferred adsorbent materials include the various charcoals produced by the destructive distillation of wood, peat, lignite, nutshells, bones, and other carbonaceous matter, and preferably such charcoals as have been heat treated, or chemically treated, or both, to form a highly porous particle structure of increased adsorbent capacity, and generally defined as activated carbon. Said adsorbent materials also include the naturally occurring clays and silicates, for example, diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate heretofore described, the solid adsorbent carrier material should be insoluble in, and otherwise inert to, the hereinafter described aqueous caustic solutions and the petroleum distillate at conditions existing in the treating zone. In the latter case, charcoal, and particularly activated carbon, is preferred because of its capacity for metal phthalocyanine and because of its stability under treating conditions. However, it should be observed that the method of this invention is also applicable to the preparation of metal phthalocyanine composited with any of the other well-known solid adsorbent carrier materials, particularly the refractory inorganic oxide.

The metal phthalocyanine may be adsorbed onto the solid adsorbent support in any conventional or otherwise convenient manner. In general, the support or carrier material, in the form of spheres, pills, pellets, granules, or other particles of uniform or irregular shape, is dipped, soaked, suspended, or otherwise immersed in the described aqueous dispersion, or the aqueous dispersion may be sprayed onto, poured over, or otherwise contacted with the adsorbent support. In any case, the excess solution and/or dispersion is separated and the resulting composite allowed to dry under ambient temperature conditions, or dried at an elevated temperature in an oven, in a flow of hot gases, or in any other suitable manner.

It is generally preferable to adsorb as much metal phthalocyanine on the adsorbent support as will form a stable catalytic composite, although a lesser amount in the range of from about 0.1 to about 10 wt. % affords a suitably active catalytic composite. One convenient method of catalyst preparation comprises passing the aqueous metal phthalocyanine dispersion through a bed of the adsorbent support predisposed in a sour petroleum distillate treating zone in order to form the catalytic composite in situ. This method allows the aqueous dispersion to be recycled one or more times to achieve a desired concentration of the metal phthalocyanine on the adsorbent support. In still another method, the adsorbent support may be predisposed in said treating chamber and the chamber thereafter filled with the aqueous metal phthalocyanine dispersion to soak the support for a predetermined period, thereby forming the catalytic composite in situ.

In the sweetening of a sour petroleum distillate as herein contemplated, the offensive mercaptans contained therein are oxidized to form disulfides. This oxidation reaction is effected in the presence of an alkaline reagent which is admixed with the sour petroleum distillate and passed in contact with the solid catalytic composite. Any suitable alkaline reagent may be employed, although an aqueous caustic solution is preferred. Other suitable alkaline solutions particularly include aqueous potassium hydroxide solutions, but also aqueous solutions of lithium hydroxide, rubidium hydroxide, and cesium hydroxide. Similarly, while water is a preferred solvent for the alkaline reagent, other solvents may be employed including, for example, alcohols, and especially methanol, ethanol, propanol, butanol, etc., ketones including acetone, methylethyl ketone, etc. In some cases, the treating is effected in the presence of both an aqueous solution of the alkaline reagent and an alcohol, particularly methanol or ethanol or solutizers or solubilizers including, for example, phenols, cresols, butyric acid, etc.

The sweetening process is usually effected at ambient temperature conditions although elevated temperatures generally not in excess of about 300° F. may be used. The process may be effected at a pressure of up to about 1000 psi or more, although atmospheric, or at substantially atmospheric, pressures are entirely suitable. Contact times equivalent to a liquid hourly space velocity of from about 1 to about 100 or more are effective to achieve a desired reduction in the mercaptan content of a sour petroleum distillate, and optimum contact time being dependent on the size of the treating zone, the quantity of catalyst contained therein, and the sour petroleum distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing agents may be employed. The mixture of petroleum distillate, alkaline reagent and oxidizing agent is passed upwardly or downwardly through the catalyst bed. In some cases, the air may be passed countercurrently to the petroleum distillate. In still other cases, the petroleum distillate and alkaline reagent may be introduced separately into the treating zone.

In many instances, the sour petroleum distillate, and especially gasoline, is first treated with an alkaline reagent solution in order to remove a major portion of the mercaptan prior to further treating in the manner hereinbefore described. Any suitable alkaline reagent, and particularly sodium hydroxide or potassium hydroxide, solution is utilized. This removes a major portion of the mercaptans but leaves a distillate which is sour. For the conversion of the mercaptans is effected in the presence of the catalytic composite herein described.

Subsequent to the extraction of mercaptans, an alkaline reagent solution containing the mercaptans as mercaptides is subjected to regeneration. In a preferred operation, this regeneration is effected by oxidation in the presence of a suitable catalyst to regenerate the alkaline metal hydroxide and to form disulfides. As another advantage to the catalyst composite of the present invention, regeneration of the used alkaline solution is effected in the presence of the catalyst and air, oxygen or other suitable oxidizing agent.

The catalytic composite prepared in accordance with the method of this invention is both active and stable. Accordingly, the catalytic composite may be employed in a fixed bed for the treatment of large volumes of a sour petroleum distillate. Although the metal phthalocyanine is somewhat soluble in alkaline solution, it is nevertheless retained on the solid adsorbent support. However, in the event that any of the metal phthalocyanine is leaked from the support, or otherwise carried away in the alkaline solution, it may be readily recycled in said solution for reuse in the sweetening process. However, it is in some cases desirable to introduce additional metal phthalocyanine for adsorption on the solid support in the manner herein described.

The following examples are presented in illustration of one preferred embodiment of this invention and are not intended as an undue limitation on the generally broad scope of the invention as set out in the appended claims.

EXAMPLE I

Cobalt phthalocyanine monosulfonate was impregnated on Norit charcoal. The charcoal particles of this and subsequent examples had an apparent bulk density of about 0.25 grams per cubic centimeter and a particle size in the 10×30 mesh range. About 150 milligrams of the cobalt phthalocyanine monosulfonate was stirred in 100 milliliters of methanol for 5 minutes. The mixture was then allowed to settle and the methanol solution decanted into a 400 milliliter beaker. The remaining cobalt phthalocyanine monosulfonate was again stirred for about 5 minutes with 100 milliliters of methanol added thereto, the mixture allowed to settle, and the methanol solution decanted into the 400 milliliter beaker. The process was repeated a third time to dissolve or disperse all of the remaining cobalt phthalocyanine monosulfonate in methanol. The methanolcobalt phthalocyanine monosulfonate dispersion, comprising 150 milligrams of cobalt phthalocyanine monosulfonate dispersed in 300 milliliters of methanol, was then added to an Erlenmeyer flask containing 100 cc of the charcoal particles. A visual inspection indicated a very good dispersion of cobalt phthalocyanine monosulfonate in the methanol. The mixture was stirred or shaken for about 3 minutes, allowed to stand under quiescent conditions for about 1 hour, and thereafter evaporated to dryness on a steam bath. The impregnated charcoal was subsequently ovendried at 200° F. for 2 hours.

EXAMPLE II

Charcoal particles, substantially as described in Example I, were again impregnated with cobalt phthalocyanine monosulfonate. In this example, 150 milligrams of the cobalt phthalocyanine monosulfonate was dispersed in 25 milliliters of water containing 1 milliliter of 28% aqueous ammonium hydroxide solution, and the dispersion was then diluted to about 125 milliliters with deionized water. The dispersion was stirred for about 5 minutes and added to an Erlenmeyer flask containing 100 cc of the fresh charcoal. A visual examination indicated a very good dispersion of cobalt phthalocyanine monsulfonate in the water. The aqueous ammonium hydroxide-cobalt phthalocyanine dispersion was then stirred or shaken for about 3 minutes in contact with the charcoal. The mixture was allowed to stand for 1 hour and the aqueous dispersion thereafter evaporated to dryness in contact with the charcoal utilizing a steam bath.

EXAMPLE III

In this example, charcoal particles substantially as described in the previous examples, were impregnated with cobalt phthalocyanine monosulfonate from an aqueous dispersion thereof. The aqueous dispersion was prepared by admixing 150 milligrams of the cobalt phthalocyanine monosulfonate with about 5 milliliters of deionized water to produce a slurry, and then diluting the aqueous dispersion to about 125 milliliters with deionized water. The dispersion was stirred for about 5 minutes and then poured over 150 cc of the charcoal particles contained in a 500 milliliter Erlenmeyer flask. The cobalt phthalocyanine dispersion was very poor by visual inspection. The aqueous cobalt phthalocyanine monosulfonate dispersion was stirred or shaken in contact with the charcoal for about 3 minutes. The mixture was allowed to stand for about 1 hour, and thereafter evaporated to dryness over a steam bath.

EXAMPLE IV

In accordance with a preferred embodiment of this invention, 150 milligrams of cobalt phthalocyanine monosulfonate was dispersed in 5 milliliters of deionized water containing 0.2 wt. % urea dissolved therein. The dispersion was stirred for about 5 minutes to produce a slurry, diluted to about 125 milliliters with deionized water, and stirred an additional 5 minutes. The cobalt phthalocyanine monosulfonate dispersion was, by visual inspection, especially good. The resulting aqueous urea-cobalt phthalocyanine monosulfonate dispersion was stirred or shaken in contact with the charcoal particles for about 3 minutes, allowed to stand for about 1 hour, and thereafter evaporated to dryness on a steam bath.

A comparative evaluation of the catalytic composite on the foregoing examples was effected in the following manner. In each case, 100 cubic centimeters of the catalytic composite was loaded into a 22 millimeter O.D. tubular glass reactor. The resulting catalyst bed was about 41 millimeters in length and rested on a fine mesh screen on top of glass beads. The catalyst bed was flooded with aqueous 10° Baume sodium hydroxide solution and then drained. A sour feed stock, containing 759 ppm mercaptans sulfur, was dripped onto the catalyst bed at a rate of 100 milliliters per hour. Air, at the rate of about 6240 cc per hour, at standard conditions, was added concurrently with the sour feed stock. The reactor effluent was analyzed periodically for mercaptan content. The results are compared in Table I below.

TABLE I

| Catalyst | RSH-S WT. PPM | | | | | |
|---|---|---|---|---|---|---|
| | 0 Hr. | 1 Hr. | 5 Hrs. | 10 Hrs. | 15 Hrs. | 20 Hrs. |
| 1 | 759 | 6 | 8 | 12 | 19 | 24 |
| 2 | 759 | 10 | 10 | 15 | 20 | 24 |
| 3 | 759 | 9 | 9 | 12 | 15 | 18 |
| 4 | 759 | 10 | 8 | 9 | 12 | 16 |

The method of manufacture presented herein offers more than a useful alternative overcoming the heretofore mentioned limitations of prior art manufacturing methods. The catalytic composite manufactured in accordance with the novel method of this invention exhibits a significant improvement in activity with respect to the conversion of mercaptans contained in a sour petroleum distillate. The activity improvement enables the effective treatment of those sour petroleum distillates comprising the more difficultly oxidizable mercaptans and highly resistant to the sweetening process.

I claim as my invention:

1. A method for treating a sour petroleum distillate which comprises oxidizing mercaptans contained in the distillate by contacting said distillate with a supported metal phthalocyanine catalyst and an oxidizing agent in the presence of an alkali metal hydroxide, said catalyst having been prepared by forming an aqueous metal phthalocyanine dispersion containing a soluble acid amide, contacting a solid adsorptive support with said dispersion at conditions to adsorb at least a catalytic amount of said metal phthalocyanine thereon, and drying the resulting composite.

2. The method of claim 1 further characterized in that said metal phthalocyanine is a vanadium phthalocyanine.

3. The method of claim 1 further characterized in that said metal phthalocyanine is a cobalt phthalocyanine.

4. The method of claim 1 further characterized in that said metal phthalocyanine is a cobalt phthalocyanine sulfonate.

5. The method of claim 1 further characterized in that said metal phthalocyanine is cobalt phthalocyanine monosulfonate.

6. The method of claim 1 further characterized in that said support is contacted with said dispersion at conditions to adsorb from about 0.1 to about 10 wt. % metal phthalocyanine thereon.

7. The method of claim 1 further characterized in that said acid amide is a diamide.

8. The method of claim 1 further characterized in that said acid amide is urea.

9. The method of claim 1 further characterized in that said acid amide is employed in from about a 1:1 to about a 2:1 wt. ratio with said metal phthalocyanine.

10. The method of claim 1 further characterized in that said adsorptive support is an activated carbon.

* * * * *